United States Patent
Park et al.

(10) Patent No.: US 10,208,229 B2
(45) Date of Patent: Feb. 19, 2019

(54) SILICONE-BASED COATING COMPOSITION AND SILICONE-BASED RELEASE FILM COMPRISING THE SAME

(71) Applicant: LG Chem, Ltd., Seoul (KR)

(72) Inventors: Jun-Hyoung Park, Gyeonggi-do (KR); Jang-Soon Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 17 days.

(21) Appl. No.: 15/513,471

(22) PCT Filed: Sep. 17, 2015

(86) PCT No.: PCT/KR2015/009795
§ 371 (c)(1),
(2) Date: Mar. 22, 2017

(87) PCT Pub. No.: WO2016/052891
PCT Pub. Date: Apr. 7, 2016

(65) Prior Publication Data
US 2017/0298251 A1 Oct. 19, 2017

(30) Foreign Application Priority Data

Sep. 29, 2014 (KR) .................. 10-2014-0130552
Sep. 16, 2015 (KR) .................. 10-2015-0131236

(51) Int. Cl.
| | | |
|---|---|---|
| *C09D 183/04* | (2006.01) | |
| *C08J 7/04* | (2006.01) | |
| *C09D 5/20* | (2006.01) | |
| *C09D 7/63* | (2018.01) | |
| *C09D 7/65* | (2018.01) | |
| *C08L 63/04* | (2006.01) | |

(52) U.S. Cl.
CPC ............ *C09D 183/04* (2013.01); *C08J 7/04* (2013.01); *C08J 7/047* (2013.01); *C09D 5/20* (2013.01); *C09D 7/63* (2018.01); *C09D 7/65* (2018.01); *C08J 2367/02* (2013.01); *C08J 2483/04* (2013.01); *C08L 63/04* (2013.01)

(58) Field of Classification Search
CPC ....... C08G 77/12; C08G 77/20; C09D 183/00
See application file for complete search history.

(56) References Cited

U.S. PATENT DOCUMENTS

| | | | |
|---|---|---|---|
| 2006/0128921 A1* | 6/2006 | Cray | ............. C09D 183/04 528/31 |
| 2008/0311333 A1 | 12/2008 | Yoon et al. | |
| 2010/0003201 A1 | 7/2010 | Wahl | |
| 2010/0179281 A1 | 7/2010 | Nilsen | |
| 2010/0255205 A1 | 10/2010 | Cray et al. | |
| 2011/0086221 A1 | 4/2011 | Pokorny et al. | |
| 2013/0302526 A1 | 11/2013 | Fish | |

FOREIGN PATENT DOCUMENTS

| | | |
|---|---|---|
| KR | 20070059680 A | 6/2007 |
| KR | 20090040474 A | 4/2009 |
| KR | 20110049770 A | 5/2011 |
| WO | 2014074372 A1 | 5/2014 |

OTHER PUBLICATIONS

Freeman (Silicones, Published for the Plastics Institute, ILIFFE Books Ltd., 1962, pp. 26-27).*
International Search Report from PCT/KR2015/009795, dated Nov. 2, 2015.

* cited by examiner

*Primary Examiner* — Kuo Liang Peng
(74) *Attorney, Agent, or Firm* — Lerner, David, Littenberg, Krumholz & Mentlik, LLP

(57) ABSTRACT

Provided is a silicone-based coating composition including: a silicone-based resin; a silicone-based hardener; and a thermal initiator, in which the silicone-based coating composition further includes a silicone-based compound of Chemical Formula 1. Also, provided is a silicone-based release film including: a base layer; and a coating layer which is a cured product of the silicone-based coating composition.

13 Claims, No Drawings

SILICONE-BASED COATING COMPOSITION AND SILICONE-BASED RELEASE FILM COMPRISING THE SAME

CROSS-REFERENCE TO RELATED APPLICATIONS

The present application is a national phase entry under 35 U.S.C. § 371 of International Application No. PCT/KR2015/009795 filed Sep. 17, 2015, published in Korean, which claims priority from Korean Application Nos. 10-2014-0130552 filed on Sep. 29, 2014 and 10-2015-0131236 filed on Sep. 16, 2015, all of which are incorporated herein by reference.

TECHNICAL FIELD

The present invention relates to a silicone-based coating composition and a silicone-based release film including the same.

BACKGROUND ART

Flat panel displays (FPDs) have been widely used as display devices of various electronic and electrical apparatuses. Examples thereof include display devices such as CRT displays, liquid crystal displays, plasma displays, organic EL displays, inorganic EL displays, LED displays, surface electrolytic displays (SEDs), and field emission displays (FEDs), or touch panels using the same, and various films are attached to the surface of the display for the purpose of scratch prevention, contamination prevention, fingerprint adhesion prevention, anti-static, anti-reflection, anti-glare, peeping prevention, and the like on the surface of the display.

It is required that the attached film is not twisted or peeled off by itself, but it is required that the attached film is easily peeled off (stripped) when the film is replaced and attached. In the related art, an organic resin-based adhesive such as an acrylic adhesive and a urethane-based adhesive has been used as an adhesive for the film.

However, since bubbles may get caught up in an adhesive film using the adhesive at the time of attaching the adhesive film, display stains such as an uneven distribution of luminance, brightness, and color on a display occurs due to the bubbles, and as a result, there is a case where the display itself is damaged at the time of peeling off and re-peeling off the adhesive film because work such as re-attaching the adhesive film or extruding bubbles needs to be performed. Thus, there is a recent need for a release film having excellent peeling characteristics.

DETAILED DESCRIPTION OF THE INVENTION

Technical Problem

An exemplary embodiment of the present invention provides a silicone-based coating composition which includes a silicone-based compound and thus has excellent peeling characteristics by adjusting a contact angle and surface energy.

Another exemplary embodiment of the present invention provides a silicone-based release film including a coating layer which is a cured product of the silicone-based coating composition.

Technical Solution

An exemplary embodiment of the present invention provides a silicone-based coating composition including: a silicone-based resin; a silicone-based hardener; and a thermal initiator, in which the silicone-based coating composition further includes a silicone-based compound of the following Chemical Formula 1.

[Chemical Formula 1]

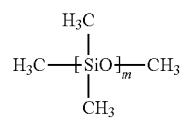

(m is an integer from 1 to 1,000).

The silicone-based coating composition may include the silicone-based compound in an amount of about 1 part by weight to about 20 parts by weight based on 100 parts by weight of the silicone-based resin.

The silicone-based resin may be polydimethylsiloxane (PDMS).

The silicone-based hardener may be one or more selected from the group consisting of hydrogen silane, toluene, and a combination thereof.

The silicone-based coating composition may include the silicone-based hardener in an amount of about 0.5 part by weight to about 5 parts by weight based on 100 parts by weight of the silicone-based resin.

The thermal initiator may be the following Chemical Formula 2:

[Chemical Formula 2]

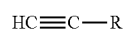

(R is $CH_3$).

A concentration of a total solid content of the silicone-based coating composition may be about 0.5 wt % to about 10 wt %.

Another exemplary embodiment of the present invention provides a silicone-based release film including: a base layer; and a coating layer which is a cured product of the silicone-based coating composition.

The coating layer may have a contact angle of about 90° to about 120°.

The coating layer may have a surface energy of about 15 mN/m to about 35 mN/m.

The coating layer may have a thickness of about 50 nm to about 200 nm.

The base layer may have a thickness of about 20 μm to about 150 μm.

The base layer may include one or more selected from the group consisting of a polyethylene resin, a polyethylene terephthalate resin, polyether ether ketone, paper, and a combination thereof.

Advantageous Effects

The silicone-based coating composition may control the contact angle and surface energy.

The silicone-based adhesive film may implement excellent peeling characteristics at various interfaces.

BEST MODE

Hereinafter, exemplary embodiments of the present invention will be described in detail. However, the exemplary embodiments are suggested as an example, the present invention is not limited thereby, and the present invention is defined only by the scope of the claims to be described below.

Silicone-Based Coating Composition

An exemplary embodiment of the present invention provides a silicone-based coating composition including: a silicone-based resin; a silicone-based hardener; and a thermal initiator, in which the silicone-based coating composition further includes a silicone-based compound of the following Chemical Formula 1. In this case, m may be an integer from 1 to 1,000. Specifically, m may be an integer from 10 to 300.

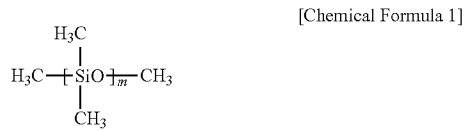

[Chemical Formula 1]

When a release film, on which a typical silicone coating composition and the like are applied, is used in a base layer in the related art, there is a problem in that since there is a little difference in surface energy between the base layer and the silicone coating composition, the wettability and the peelability deteriorate.

Since the silicone-based compound of Chemical Formula 1 is further included in addition to a silicone-based resin, a silicone-based hardener, and a thermal initiator in order to solve the problem, it is possible to provide a release film having excellent peeling characteristics at various interfaces by adding the silicone-based compound of Chemical Formula 1 to control the contact angle and surface energy of the silicone-based coating composition.

Specifically, since the silicone-based compound serves as a release force regulator, it is possible to lower the surface energy of a coating layer formed of the composition by using the hydrophilicity of the silicone-based compound and to have the wetting balance between the coating layer and a base layer to be adhered.

The silicone-based coating composition may include the silicone-based compound in an amount of about 1 part by weight to about 20 parts by weight based on 100 parts by weight of the silicone-based resin.

When the silicone-based compound is included in an amount of less than about 1 part by weight, an effect of adjusting the surface energy of the coating layer formed of the composition may be minimal, and when the silicone-based compound is included in an amount of more than about 20 parts by weight, the silicone-based resin may degrade the adhesion effect.

Therefore, the effect of adjusting the surface energy of the coating layer may be maximized by including the silicone-based compound within the range.

The silicone-based resin may be polydimethylsiloxane (PDMS). For example, when the silicone-based resin is PDMS of the following General Formula 1, the vinyl group of Si—CH=CH2 of PDMS may participate in a curing reaction to improve the durability of the coating layer formed of the composition, and to increase the peel force by adjusting the content with a silicone-based hardener to be described below.

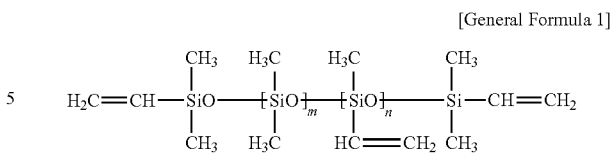

[General Formula 1]

(m is an integer from 1 to 1,000 and n is an integer from 1 to 10,000).

Specifically, the PDMS may have a viscosity of about 100 cps to about 20,000 cps. When the viscosity of the PDMS is too low, a problem is caused when the composition is applied on the upper portion of a base layer and dried, and when the viscosity thereof is too high, a problem with the flatness of the coating formed is caused by a sharp increase in viscosity, thereby causing a deterioration in peel force of the release film.

The silicone-based hardener may be one or more selected from the group consisting of hydrogen silane, toluene, and a combination thereof.

For example, the silicone-based hardener may be hydrogen silane of the following General Formula 2, and the hydrogen silane may have an average viscosity of about 1 cps to about 5,000 cps.

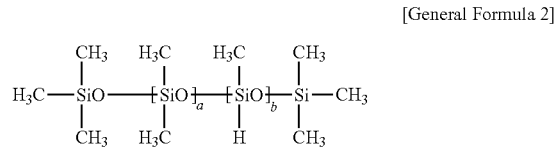

[General Formula 2]

(a is an integer form 1 to 500 and b is an integer from 1 to 500).

The silicone-based coating composition may include the silicone-based hardener in an amount of about 0.5 part by weight to about 5 parts by weight based on 100 parts by weight of the silicone-based resin. When the silicone-based hardener is included in an amount of less than about 0.5 part by weight, there is a concern in that the curing is minimal, and when the silicone-based hardener is included in an amount of more than about 5 parts by weight, there is a problem such as over-curing, rapid curing, and a change over time, so that the stability may be maintained during the curing by maintaining the content within the range.

The thermal initiator may be the following Chemical Formula 2 included in the composition:

[Chemical Formula 2]

(R is CH3)

Specifically, R of Chemical Formula 2 surrounds a platinum catalyst, and the platinum catalyst is not exposed because the thermal initiator is not activated at a low temperature, but at a temperature equal to or higher than a predetermined temperature of about 60° C. to about 80° C., the bonds are broken and the platinum catalyst is exposed, and as a result, the thermal initiator may serve to adjust the reaction so as to activate the reaction.

The composition may include a solvent, for example, a solvent obtained by adding a platinum catalyst in an amount of about 1,000 to 10,000 ppm to toluene in addition to the constituent elements described above, and the platinum catalyst serves to facilitate an addition reaction of the silicone-based resin with the silicone-based hardener at a predetermined temperature, and the content of the platinum catalyst may be adjusted depending on the content of the silicone-based resin and the silicone-based hardener.

For example, a process of curing the silicone-based resin and the silicone-based hardener by a platinum catalyst may be represented by the following General Formula 3.

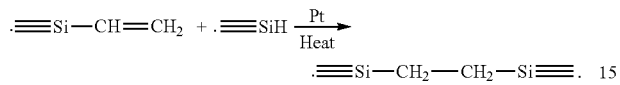

Further, in addition to the platinum catalyst, a crosslinking agent, a peel force controlling agent, a silicone resin for imparting adhesion, and the like may be further included.

A concentration of a total solid content of the silicone-based coating composition may be about 0.5 wt % to about 10 wt %. When the concentration of the solid content is less than about 0.5 wt %, there may occur an application defect in which the silicone-based resin fails to be sufficiently present on the surface of the base layer after the composition is coated and dried, and when the concentration of the solid content is more than about 10 wt %, the viscosity of the composition is rapidly increased, and as a result, there may occur a deterioration in wettability at the time of applying the composition on the surface of the base layer.

Thus, it is advantageous to maintain the concentration of the solid content within the range in term of an appropriate curing degree and a good base adhesion.

Silicone-Based Release Film

Another exemplary embodiment of the present invention provides a silicone-based release film including: a base layer; and a coating layer which is a cured product of the silicone-based coating composition.

The coating layer may be formed by applying the silicone-based coating composition on the upper portion of the base layer and curing the coating composition. It is possible to use a publicly-known method such as a bar coat method, a doctor blade method, a reverse roll coat method, or a gravure roll coat method at the time of applying the composition.

In curing the silicone-based coating composition, heat, ultraviolet rays, electromagnetic rays, and the like may be used, but curing by heat is advantageous in consideration of curing speed, ease of procuring an irradiation device, prices, and the like. When the curing by heat is performed, a dryer device may be used, and the curing time may be adjusted depending on the distance from a light source, the type of light source, and the like.

For example, it is advantageous to perform a thermal curing at a temperature of about 80° C. to about 150° for about 10 seconds to about 100 seconds, in that the composition is completely cured, and as a result, the durability may be secured.

The matters on the silicone-based coating composition are as described above.

The 'contact angle' is an angle obtained when a thermodynamic equilibrium is established on a liquid and a solid surface, and is a measure exhibiting the wettability of the solid surface and is measured in most cases by water drops to be fixedly adhered. In this case, a low contact angle indicates high surface energy, and a high contact angle indicates low surface energy. The coating layer exhibits a difference in surface energy between the coating layer and the base layer by implementing a high contact angle and low surface energy, thereby securing excellent peeling characteristics.

For example, the coating layer may have a contact angle of about 90° to about 120°. Further, the coating layer may have surface energy of about 15 mN/m to about 35 mN/m. Specifically, the coating layer may have surface energy of about 15 mN/m to about 30 mN/m.

The contact angle and the surface energy are contradicting values, and the composition includes the silicone compound of Chemical Formula 1, thereby obtaining the contact angle and surface energy values within the ranges.

The coating layer may have a thickness of about 50 nm to about 200 nm. When the coating layer has a thickness of less than about 50 nm, the coating layer is so thin that the release performance may deteriorate, and when the coating layer has a thickness of more than about 200 nm, the coating layer is so thick that there may occur a problem with the durability because the curing time is prolonged, and accordingly, it is advantageous to maintain the thickness within the range, in that it is possible to secure excellent release stability, curing stability, and base adhesion.

The base layer may include one or more selected from the group consisting of a polyethylene resin, a polyethylene terephthalate resin, polyether ether ketone, paper, and a combination thereof. Specifically, the base layer may have a thickness of about 20 μm to about 150 μm.

Hereinafter, specific examples of the present invention will be suggested. However, the Examples described below are only provided for specifically exemplifying or explaining the present invention, and the present invention is not limited thereby.

EXAMPLES AND COMPARATIVE EXAMPLES

Example 1

5 parts by weight of the hydrogen silane of General Formula 2 as a silicone-based hardener, 2 parts by weight of the silicone-based compound of Chemical Formula 1 (m is an integer from 10 to 300), and Chemical Formula 2 (R is $CH_3$) as a thermal initiator, based on 100 parts by weight of the PDMS of General Formula 1, was stirred together with a solvent to form a silicone-based coating composition having a solid content of 1.7 wt %, and the composition was applied on a polyethylene terephthalate resin film and thermally cured to manufacture a silicone-based release film including a coating layer having a thickness of 150 nm.

Example 2

A silicone-based release film was manufactured in the same manner as in Example 1, except that the silicone-based compound of Chemical Formula 1 was included in an amount of 5 parts by weight.

Example 3

A silicone-based release film was manufactured in the same manner as in Example 1, except that the silicone-based compound of Chemical Formula 1 was included in an amount of 10 parts by weight.

Example 4

A silicone-based release film was manufactured in the same manner as in Example 1, except that the silicone-based compound of Chemical Formula 1 was included in an amount of 15 parts by weight.

Example 5

A silicone-based release film was manufactured in the same manner as in Example 1, except that the polyethylene terephthalate resin film was replaced with a polyethylene resin film.

Comparative Example 1

A polyethylene terephthalate resin film including no coating layer was prepared.

Comparative Example 2

A polyethylene resin film including no coating layer was prepared.

Comparative Example 3

A silicone-based release film was manufactured in the same manner as in Example 1, except that the silicone-based compound of Chemical Formula 1 was not included.

Comparative Example 4

A silicone-based release film was manufactured in the same manner as in Example 5, except that the silicone-based compound of Chemical Formula 1 was not included.

Experimental Examples

1) Measurement of Contact Angle: A change in contact angle was measured by dropping ultrapure water and diiodomethane on the release films in the Examples and the Comparative Examples using a contact angle analyzer tester.

2) Measurement of Surface Energy: The contact angle was measured by means of ultrapure water and diiodomethane, and a surface energy was calculated by inputting the measured contact angle into the Owens-Wendt Equation.

In the following Table 1, 'Pol' means the surface energy which exhibits a polar tendency calculated by dropping ultrapure water on the films in the Examples and the Comparative Examples, and 'Dis' means the surface energy which exhibits a non-polar tendency calculated by dropping diiodomethane on the films in the Examples and the Comparative Examples. The total surface energy corresponds to a total of the surface energies (Pol and Dis).

TABLE 1

| | Surface energy | | |
| --- | --- | --- | --- |
| | Dis (mN/m) | Pol (mN/m) | Total (mN/m) |
| Example 1 | 30.31 | 1.22 | 31.53 |
| Example 2 | 27.38 | 0.91 | 28.29 |
| Example 3 | 25.89 | 0.73 | 26.62 |
| Example 4 | 24.62 | 0.50 | 25.12 |
| Example 5 | 21.30 | 1.56 | 22.86 |
| Comparative Example 1 | 42.58 | 3.12 | 45.7 |
| Comparative Example 2 | 27.34 | 3.96 | 31.3 |
| Comparative Example 3 | 33.11 | 2.29 | 35.40 |
| Comparative Example 4 | 26.71 | 3.55 | 30.26 |

Referring to Table 1, it could be seen that in Examples 1 to 5, the contact angles were larger and the surface energies were smaller than those in Comparative Examples 1 and 4. The larger the contact angle was and the smaller the surface energy was, the more likely excellent peeling characteristics could be implemented, and it was confirmed that Examples 1 to 5 including a silicone compound in a predetermined content or more had better peeling characteristics than Comparative Examples 1 to 4 including no silicone compound.

The invention claimed is:
1. A silicone-based coating composition comprising:
a silicone-based resin;
a silicone-based hardener; and
a thermal initiator,
wherein the silicone-based coating composition further comprises a silicone-based compound of the following Chemical Formula 1:

[Chemical Formula 1]

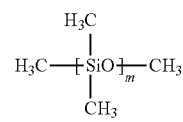

(m is an integer from 1 to 1,000).

2. The silicone-based coating composition of claim 1, wherein the silicone-based coating composition comprises the silicone-based compound in an amount of 1 part by weight to 20 parts by weight based on 100 parts by weight of the silicone-based resin.

3. The silicone-based coating composition of claim 1, wherein the silicone-based resin is polydimethylsiloxane (PDMS).

4. The silicone-based coating composition of claim 1, wherein the silicone-based hardener is hydrogen silane.

5. The silicone-based coating composition of claim 1, wherein the silicone-based coating composition comprises the silicone-based hardener in an amount of 0.5 part by weight to 5 parts by weight based on 100 parts by weight of the silicone-based resin.

6. The silicone-based coating composition of claim 1, wherein the thermal initiator is the following Chemical Formula 2:

[Chemical Formula 2]

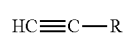

(R is $CH_3$).

7. The silicone-based coating composition of claim 1, wherein a concentration of a total solid content of the silicone-based coating composition is 0.5 wt % to 10 wt %.

8. A silicone-based release film comprising:
a base layer; and
a coating layer which is a cured product of the silicone-based coating composition comprising claim 1.

9. The silicone-based release film of claim 8, wherein the coating layer has a contact angle of 90° to 120° when measured by dropping ultrapure water and diiodomethane on the release film.

10. The silicone-based release film of claim 8, wherein the coating layer has a surface energy of 15 mN/m to 35 mN/m.

11. The silicone-based release film of claim 8, wherein the coating layer has a thickness of 50 nm to 200 nm.

12. The silicone-based release film of claim 8, wherein the base layer has a thickness of 20 μm to 150 μm.

13. The silicone-based release film of claim 8, wherein the base layer comprises one selected from the group consisting of a polyethylene resin, a polyethylene terephthalate resin, polyether ether ketone, paper, and a combination thereof.

* * * * *